(12) United States Patent
Armon et al.

(10) Patent No.: US 8,583,386 B2
(45) Date of Patent: *Nov. 12, 2013

(54) SYSTEM AND METHOD FOR IDENTIFYING LIKELY GEOGRAPHICAL LOCATIONS OF ANOMALIES IN A WATER UTILITY NETWORK

(75) Inventors: Amitai Armon, Tel Aviv (IL); Haggai Scolnicov, Tel Aviv (IL); Chaim Linhart, Petach Tikva (IL); Raz Ziv, Tel Aviv (IL)

(73) Assignee: Takadu Ltd., Yehud (IL)

( * ) Notice: Subject to any disclaimer, the term of this patent is extended or adjusted under 35 U.S.C. 154(b) by 321 days.

This patent is subject to a terminal disclaimer.

(21) Appl. No.: 13/008,819

(22) Filed: Jan. 18, 2011

(65) Prior Publication Data

US 2012/0185184 A1   Jul. 19, 2012

(51) Int. Cl.
  *G06F 19/00*  (2011.01)
  *G06F 17/18*  (2006.01)
(52) U.S. Cl.
  USPC ............................................. 702/51; 702/179
(58) Field of Classification Search
  USPC .......................................................... 702/51
  See application file for complete search history.

(56) References Cited

U.S. PATENT DOCUMENTS

| | | | |
|---|---|---|---|
| 4,361,030 A * | 11/1982 | Heide ........................ | 73/40.5 R |
| 4,712,182 A | 12/1987 | Wakamori et al. | |
| 4,797,621 A | 1/1989 | Anderson et al. | |
| 5,301,538 A | 4/1994 | Recla | |
| 5,315,529 A | 5/1994 | Farmer | |
| 5,546,789 A | 8/1996 | Balke et al. | |
| 5,708,195 A | 1/1998 | Kurisu et al. | |
| 5,756,880 A | 5/1998 | Chen et al. | |
| 5,883,815 A | 3/1999 | Drakulich et al. | |
| 6,067,477 A | 5/2000 | Wewalaarachchi et al. | |
| 6,076,048 A | 6/2000 | Gunther et al. | |
| 6,088,417 A | 7/2000 | Jax et al. | |
| 6,109,096 A | 8/2000 | Chen et al. | |
| 6,147,613 A | 11/2000 | Doumit | |
| 6,336,131 B1 | 1/2002 | Wolfe | |
| 6,477,434 B1 | 11/2002 | Wewalaarachchi et al. | |
| 6,526,358 B1 | 2/2003 | Mathews, Jr. et al. | |
| 6,687,637 B2 | 2/2004 | Garabedian | |
| 6,691,724 B2 | 2/2004 | Ford | |
| 6,845,336 B2 | 1/2005 | Kodukula et al. | |
| 6,862,540 B1 | 3/2005 | Welch et al. | |

(Continued)

*Primary Examiner* — Bryan Bui
(74) *Attorney, Agent, or Firm* — Ostrow Kaufman, LLP

(57) ABSTRACT

A computerized method for determining one or more statistically likely geographical locations of an anomaly in a region or zone of a water utility network, the water utility network comprising at least a network of pipes for delivering water to consumers and a plurality of meters positioned within the water utility network including a plurality of meters capturing data regarding the water delivering within the region or zone of the anomaly, the method comprising. The method includes receiving anomaly event data, the anomaly event data representing an indication of an anomaly occurring or having occurred within a region or zone of the water utility network, the anomaly event data being associated with meter data produced by one or more of the meters. The method also includes performing a plurality of tests on the anomaly event data each designed to statistically determine a likely geographical location of the anomaly within the region or zone, the performance of each test producing a result. The results of the plurality of tests to generate scores for the determined likely locations for the anomaly are combined. The one or more of the determined likely locations are presented to a user.

30 Claims, 10 Drawing Sheets

(56) References Cited

U.S. PATENT DOCUMENTS

| | | | |
|---|---|---|---|
| 6,963,808 B1 | 11/2005 | Addink et al. | |
| 6,970,808 B2 * | 11/2005 | Abhulimen et al. | 702/185 |
| 6,985,779 B2 | 1/2006 | Hsiung et al. | |
| 6,985,831 B2 | 1/2006 | Ito et al. | |
| 6,993,403 B1 | 1/2006 | Dadebo et al. | |
| 6,995,846 B2 | 2/2006 | Kalayeh et al. | |
| 7,119,698 B2 * | 10/2006 | Schleich et al. | 340/605 |
| 7,135,956 B2 | 11/2006 | Bartone et al. | |
| 7,228,726 B2 | 6/2007 | Kates | |
| 7,233,876 B2 | 6/2007 | Halstead et al. | |
| 7,263,459 B2 | 8/2007 | Ito et al. | |
| 7,283,913 B2 | 10/2007 | Garnaes et al. | |
| 7,310,590 B1 | 12/2007 | Bansal | |
| 7,330,796 B2 | 2/2008 | Addink et al. | |
| 7,412,876 B2 | 8/2008 | Kates | |
| 7,424,399 B2 | 9/2008 | Kahn et al. | |
| 7,437,267 B2 | 10/2008 | Oka et al. | |
| 7,504,964 B2 | 3/2009 | Bianchi et al. | |
| 7,523,016 B1 | 4/2009 | Surdulescu et al. | |
| 7,526,944 B2 | 5/2009 | Sabata et al. | |
| 7,529,644 B2 | 5/2009 | Lenz et al. | |
| 7,536,371 B2 | 5/2009 | Hartman et al. | |
| 7,558,703 B2 | 7/2009 | Stoupis et al. | |
| 7,558,771 B2 | 7/2009 | Barajas et al. | |
| 7,587,481 B1 | 9/2009 | Osburn, III | |
| 7,647,136 B2 | 1/2010 | McDowell | |
| 7,669,461 B2 | 3/2010 | Kates | |
| 7,670,494 B2 | 3/2010 | Frank | |
| 7,680,611 B2 | 3/2010 | Guidi et al. | |
| 7,698,073 B2 | 4/2010 | Wolfe | |
| 7,720,615 B2 | 5/2010 | Kim | |
| 7,739,004 B2 | 6/2010 | Johnson | |
| 7,793,188 B2 | 9/2010 | Mukhopadhyay et al. | |
| 7,920,983 B1 * | 4/2011 | Peleg et al. | 702/100 |
| 2002/0116282 A1 | 8/2002 | Martin et al. | |
| 2003/0101009 A1 | 5/2003 | Seem | |
| 2003/0192600 A1 | 10/2003 | Ford | |
| 2005/0190074 A1 | 9/2005 | Cumeralto et al. | |
| 2005/0246112 A1 | 11/2005 | Abhulimen et al. | |
| 2006/0179463 A1 | 8/2006 | Chisholm et al. | |
| 2007/0016399 A1 | 1/2007 | Gao et al. | |
| 2007/0203860 A1 | 8/2007 | Golden et al. | |
| 2007/0219728 A1 | 9/2007 | Papageorgiou et al. | |
| 2007/0233397 A1 | 10/2007 | Kim | |
| 2007/0247331 A1 | 10/2007 | Angelis et al. | |
| 2007/0288200 A1 | 12/2007 | Guidi et al. | |
| 2008/0109175 A1 | 5/2008 | Michalak | |
| 2008/0168339 A1 | 7/2008 | Hudson et al. | |
| 2008/0250497 A1 | 10/2008 | Mullarkey et al. | |
| 2009/0299660 A1 | 12/2009 | Winter | |
| 2010/0169477 A1 | 7/2010 | Stienhans et al. | |

* cited by examiner

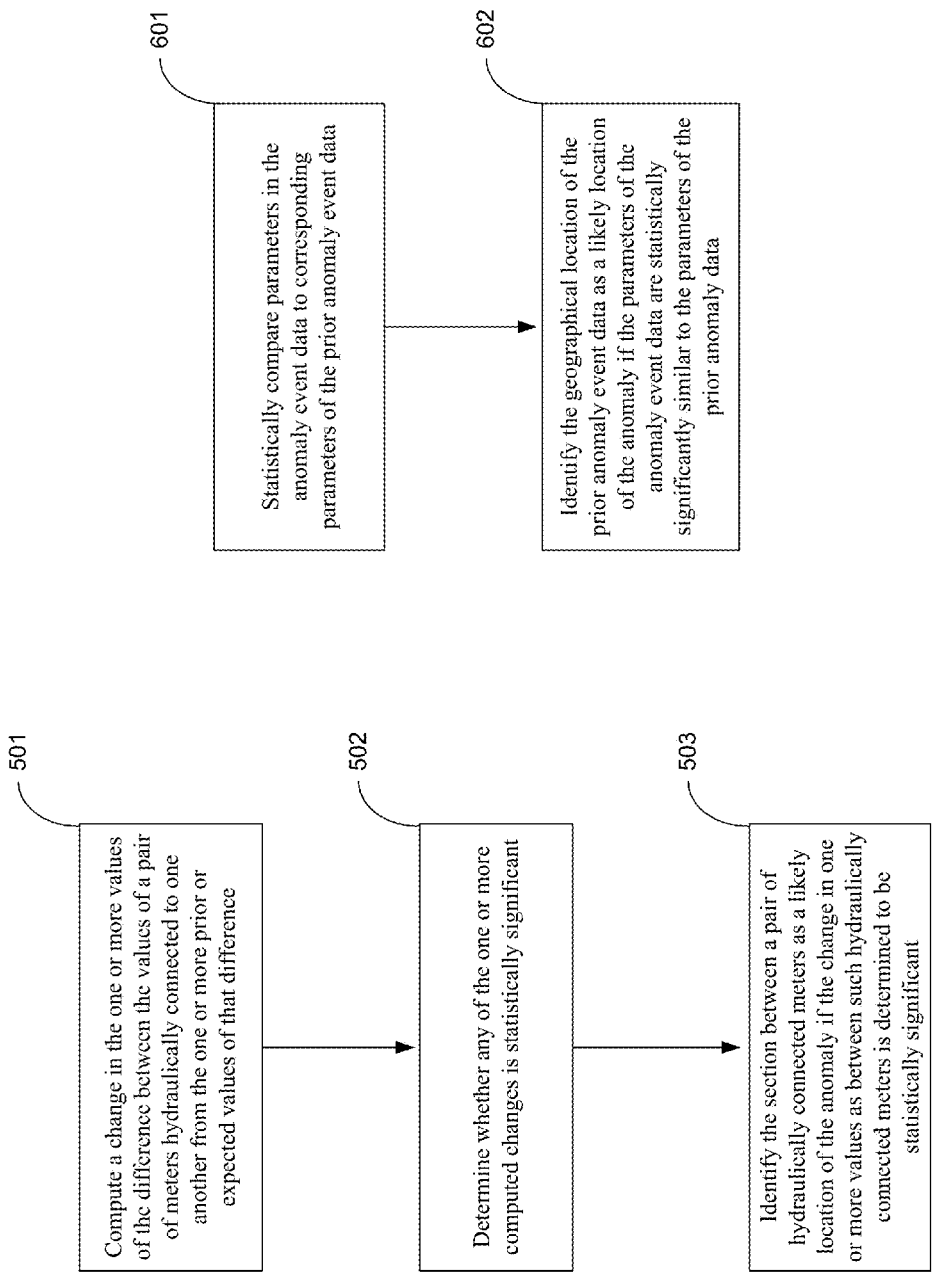

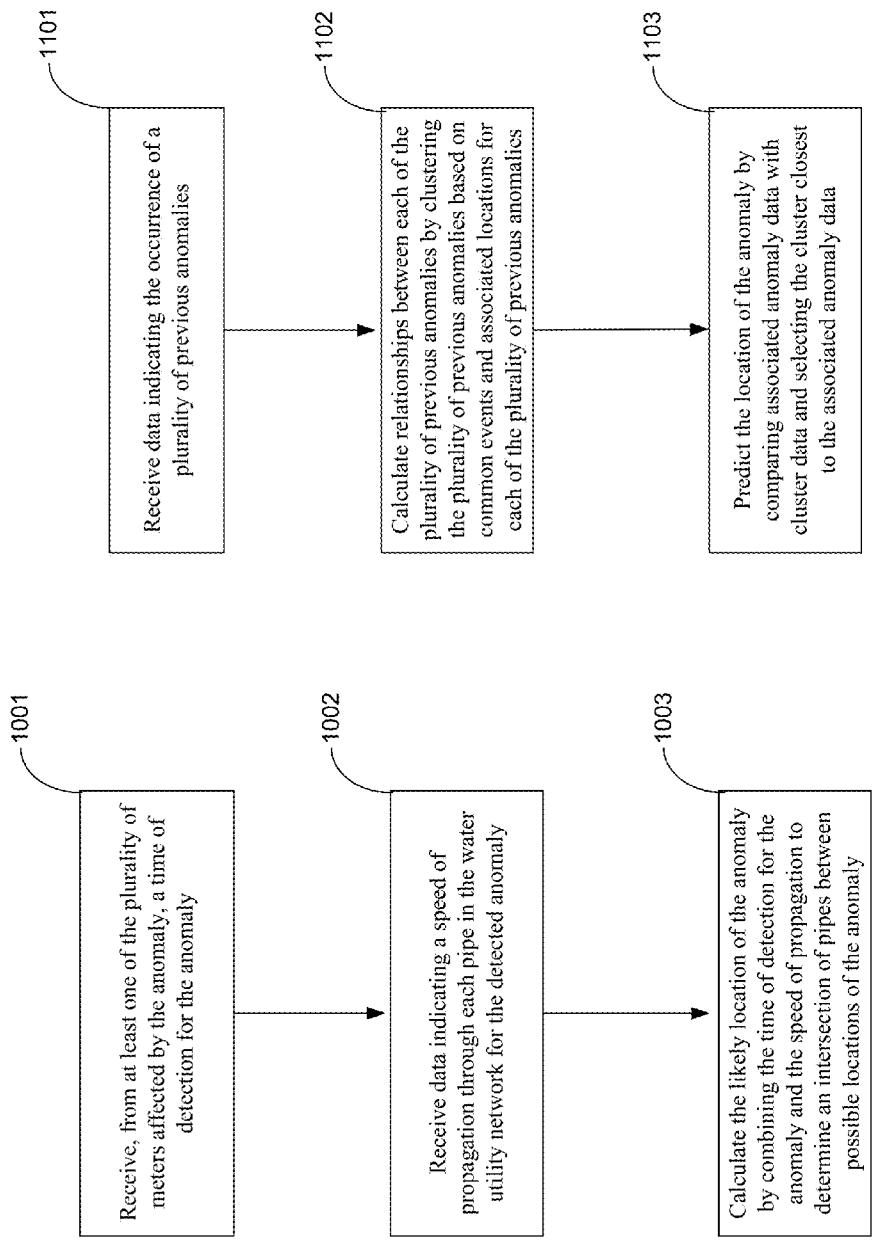

SYSTEM AND METHOD FOR IDENTIFYING LIKELY GEOGRAPHICAL LOCATIONS OF ANOMALIES IN A WATER UTILITY NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The field of the invention relates generally to monitoring resource distribution systems, such as a water utility network, and locating anomalies associated with the distributed network.

BACKGROUND OF THE INVENTION

The United Nations notes that water use has been growing at more than twice the rate of population increase in the last century, and an increasing number of regions are chronically short of water. By 2025 two-thirds of the world's population could be under water stress conditions as a result of increased populations. Water, especially potable water, is essential for all socio-economic developments and for maintaining a healthy population. As populations increase across the globe they call for an increased allocation of clean water for use, resulting in increased water scarcity.

One method to address water scarcity and conserve resources is the detection of leaks and other events occurring in water utility networks. Some experts estimate that losses due to leaks and theft amount to 25-30% of the water flowing through water utility networks. Therefore, a significant amount of water may be conserved merely by addressing the water loss in systems already controlled by humans.

Traditionally, detecting and locating leaks has been accomplished using simple and direct methods, such as acoustic measurements or direct physical inspection by utility personnel, such as field crews. However, these methods suffer from the drawbacks of requiring invasive measurements and possibly excavation works, which can impose a significant cost in both time and resources to the utility operators.

Currently, systems exist to facilitate detection of leaks and other anomalous events occurring in a water utility network. For example, some current systems in the market, such as water network sensors available from ABB Limited of England, or those discussed in patents such as U.S. Pat. No. 4,361,060 or 6,970,808 or U.S. patent application Ser. No. 0247331, profess to be able to detect leaks in some forms of resource delivery networks. An improved system, described in commonly owned U.S. patent application Ser. No. 12/717,944, entitled "SYSTEM AND METHOD FOR MONITORING RESOURCES IN A WATER UTILITY NETWORK" which is herein incorporated by reference in its entirety, describes various systems and methods for detecting anomalies in a water utility network, using statistical techniques to provide a higher likelihood of accuracy than other existing or proposed systems. These and other systems identify the possibility of leaks or other anomalies with some general data about possible locations, based on affected sensors or meters.

Further resource management can be achieved by improving the current systems to help network operators determine more precisely the location of previously detected anomalies, to thereby find the leaks and other anomalies much more quickly, confirm them, and fix them. Often, in a typical scenario, when alerting on an anomaly the detection system or work process will yield a general location such as a DMA, or part of the water utility network, which must then be reduced to a pinpoint location by more expensive secondary means, such as a survey by field crew. The cost of determining such pinpoint location is generally proportional to the area or length of the network which must be explored to pinpoint the anomaly.

As such, there exists a need for improved systems and methods to further analyze data regarding anomalous events to refine a given general location of the events to a more precise identification of location, at a high degree of statistical accuracy.

SUMMARY OF THE INVENTION

Some or all of the above and other deficiencies in the prior art are resolved by a computerized method and corresponding system for determining one or more statistically likely geographical locations of an anomaly suspected to have occurred in a region or zone of a water utility network. The water utility network is made up of a network of pipes for delivering water to consumers and has meters, often many meters, positioned within the water utility network. The meters are typically placed by the water utility at various, irregular positions throughout the network and provide an incomplete set of data regarding the flow and condition of water on the network as a whole. The sensors measure quantities such as, flow, pressure, reservoir levels, acidity, turbidity, chlorination, noise. The meters may be positioned on the interior or exterior of the pipes, near the network devices, or in other arbitrary locations. In particular for purposes of the inventions described herein, meters are positioned within, in proximity of or in locations hydraulically related to the region or zone of the anomaly and capture data whose values may be affected by the occurrence of the anomaly or by the occurrence of an anomaly in that zone.

In accordance with some aspects of the invention, the method includes receiving anomaly event data, the anomaly event data representing an indication of an anomaly occurring or having occurred within a region or zone of the water utility network. Types of anomalies include leaks, loss of pressure, unusual increase in water consumption or flow, increased turbidity, unsafe or unusual changes in chlorine levels, unsafe or unusual changes in pH levels, and the like. In some examples of the method, receiving anomaly event data includes retrieving the anomaly event data from a database, or receiving the anomaly event data over a network. The anomaly event data is associated with meter data produced by one or more of the meters, typically at least the meters that are affected by the anomaly or from which meter data was received by which the anomaly was detected. There may also be a predetermined list of meters that are relevant to that zone, e.g., in a DMA, the relevant meters may be defined as all the flow and pressure meters at the perimeter of that DMA and within it. The anomaly event data may also include previously computed data on the magnitude of the anomaly, the statistical likelihood of the occurrence of such an anomaly, the region or zone in the water utility network in which the anomaly was detected, and other information.

In some embodiments, the method includes receiving a predicted or expected value for some or all of the sensors (or an expected distribution of values). Such values may be derived from a modeled, predicted or expected value or from a statistical prediction based on meter data and other secondary data, for example, as described in U.S. application Ser. No. 12/717,944, which may have been calculated already by and received from the anomaly detection engine.

In accordance with some embodiments of the computerized method, a plurality of tests are performed on the anomaly event data, each of the tests designed to statistically determine a likely geographical location of the anomaly within the region or zone, each test producing a result. Some of the tests are performed using the anomaly event data and its associated meter data. Some tests, for example, those related to leaks, are performed on meter data representing some of the following quantities: flow, pressure, reservoir levels, noise, or other indicators of hydraulic activity.

In some embodiments, two or more of the tests are performed in parallel on the anomaly event data. Thus, these tests all use the same anomaly event data as inputs, may use other, different data sets as well, and produce as outputs one or more likely locations for the anomaly. In other embodiments, one or more of the tests are performed on the anomaly event data and/or the result of another of the tests. Thus, in some cases, testing is performed on the likely locations identified by other tests to, for example, eliminate some of the likely locations based on other data such as external data on the water utility network. In further embodiments, certain tests are performed repeatedly on anomaly event data sets received over time representing an indication that the same anomaly is continuing to occur in the water utility network at different times. The results of these tests may then be combined to determine a likely location for the anomaly.

In some embodiments, secondary data is used in the testing representing additional information other than meter data about the water utility network or conditions affecting consumption of water delivered by the water utility network. Some examples of the secondary data include one or more of the following: map data representing a geographical or schematic map of the water utility network; historical data representing past meter data for the meter data associated with the anomaly event data; repair data representing one or more repairs performed on the water utility network; external data representing weather or other conditions affecting water consumption in the water utility network; asset management data, such as the ages and materials of pipes and other network assets; and other data which indicates an anomaly, such as consumer reports of service failures or sightings of a visible burst.

One of the tests performed involves, in some embodiments, comparing one or more affected values of the meter data across a plurality of the meters and identifying one or some of the meters as being most affected by the anomaly. The area which is closest to those most affected sensors is identified as a likely location of the anomaly. For example, where the anomaly event data represents an indication of a leak, the affected values being compared may be flow or pressure values in the meters. The one or more affected values of the meter data may be compared in one of several ways, such as by computing an absolute increase in the one or more affected values in each of the meters relative to a predicted or expected value and comparing the absolute increases across the meters, by computing a relative increase in the one or more affected values in each of the meters relative to a predicted or expected value and comparing the relative increases across the meters, and by computing a statistical likelihood in the change in the one or more affected values in each of the meters relative to a predicted or expected value and comparing the statistical changes across the meters.

Another of the tests performed involves, in some embodiments, computing a change in one or more values of parameters in meter data affected by the anomaly from one or more prior values of such parameters from such meters as between one or more pairs of meters hydraulically connected to one another along a section of the water utility network. For example, this may include computing a pressure drop between one or more pairs of hydraulically connected meters and a prior or otherwise expected pressure drop between the one or more pairs of hydraulically connected meters. If any of the one or more computed changes is statistically significant, the section of the water network between the pair of hydraulically connected meters is identified as a likely location of an anomaly in related quantity. In the above example, an anomalous increase or decrease in pressure drop indicates a corresponding anomaly in flow between those two sensors, in turn indicating an anomaly such as a leak between those sensors or downstream of them.

In another test performed according to some embodiments, prior anomaly event data is received representing one or more prior occurrences of the same type of anomaly in the water utility network and a geographical location for each of the one or more prior occurrences. The test then involves comparing the anomaly event data to the prior anomaly event data by, for example, statistically comparing parameters in the anomaly event data to corresponding parameters of the prior anomaly event data. The geographical location of the prior anomaly event data is then identified as a likely location of the anomaly if the parameters of the anomaly event data are statistically significantly similar to the parameters of the prior anomaly data. In particular embodiments, relationships are calculated between each of the plurality of prior anomalies by clustering the plurality of prior anomaly event data based on the associated meter data and the associated locations for each of the plurality of previous anomalies. A likely location of the anomaly can then be identified by comparing the anomaly event data with the clustered prior anomaly data and selecting a cluster closest to the associated anomaly data; the likely location identified is an area roughly containing all prior events in that cluster.

In yet a further possible test to be used in accordance with embodiments of the present invention, secondary data is received representing additional information other than meter data about the water utility network, where the secondary data represents, e.g., conditions affecting consumption of water delivered by the water utility network, or the environment of the network, or utility operations. The test then involves correlating the prior anomaly event data and secondary data and comparing the anomaly event data to the correlated prior anomaly event data and secondary data. The correlating may involve constructing a distribution of geographical or network location data of prior anomalies. A likely location of the anomaly may then be identified by analyzing the anomaly event data against the distribution of geographical or network location data. This test may be performed, in some embodiments, as against data from a second water utility network, by constructing a distribution of network data from the second water utility network and identifying a likely location of the anomaly by analyzing the anomaly event data against the distribution of network data from the second water utility network. For example, analysis of prior events in the second water utility network may yield an estimate of the likelihood of bursts in pipes of various materials and ages, which could then be applied to the network under consideration.

An additional test performed in some embodiments involves calculating a time of detection for the anomaly at each meter and data indicating a speed of propagation through each pipe in the water utility network for the detected anomaly. The test then involves calculating the likely location of the anomaly by combining the time of detection for the anomaly and the speed of propagation along the network or as appropriate to determine an a location or locations where the differences between measured times of arrival match the expected times of arrival.

An additional test, performed in some embodiments, involves eliminating a likely location by comparing characteristics of the anomaly and fixed constraints or secondary data such as pipe diameter data, service failure data, and network layout data. Thus, if a likely location has the anomaly occurring in a section of the water network in which such anomaly could not occur, such as a burst which is larger than the typical flow through that pipe, it would be eliminated from consideration. Similarly, a breach between two zones or DMAs can only occur where there are valves connecting the two breached zones: abnormally high consumption of certain magnitudes is less likely (or impossible) in many residential service connections than in a commercial or industrial connection; and an anomaly identified as a likely case of water theft could be characteristic of theft from a fire hydrant or similarly exposed connection.

The results of these tests are the identification of likely locations for the anomaly. The results are then combined to generate scores for the determined likely locations for the anomaly. The most likely location or locations are then presented to a user, possibly with the associated scores. Other data regarding the anomaly may also be reported with the likely location(s), to aid the user in refining the location, including characteristics of the anomaly and data associated with related anomalies detected previously.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 3 through 11 present flow diagrams illustrating methods for locating anomalies within a water utility network according to embodiments of the present invention.

DETAILED DESCRIPTION OF THE EMBODIMENTS

In the following description, reference is made to the accompanying drawings that form a part hereof, and in which is shown by way of illustration of specific embodiments in which the invention may be practiced. It is to be understood that other embodiments may be utilized and structural changes may be made without departing from the scope of the present invention.

Figure 1:
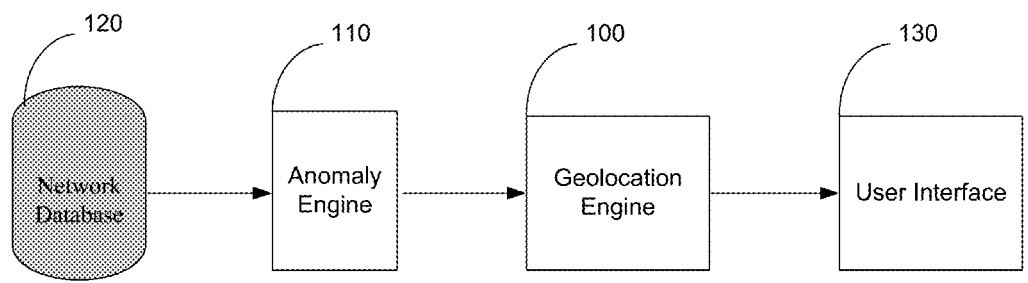
FIGS. 1 and 2 present block diagrams depicting systems for locating anomalies within a water utility network according to embodiments of the present invention.

FIG. 1 presents a block diagram illustrating one embodiment of a system for locating anomalies within a water utility network. As shown in FIG. 1, the system includes a Geolocation Engine 100 composed of various software modules and databases residing on computer hardware and performing the functions described further below. The Geolocation Engine 100 may include one or more processing devices performing the below-described operations in response to executable instructions. The Geolocation Engine 100 analyzes data received from Anomaly Engine 110 which, in turn, receives data from Network Database 120. The Network Database 120 receives information from different meters, sensors, reading devices, or other data pertaining to a distribution network (not shown). One of skill in the art will appreciate that unless the specific context explicitly indicates otherwise, as used herein the terms "meter" and "sensor" generally refer to the same class of network devices and encompass any meter, sensor, gauge, or other device capable of measuring parameters or values or a stimulus, especially stimuli relating to a water distribution network. Different sensor types may be used (for different anomaly types, including water quality, acoustic). The quantities being compared depend on the sensor type. For example, with flow meters the system compares the change in flow (relative or absolute); with pressure meters the system may compare the "head loss" or drop in pressure between pairs of hydraulically adjacent sensors, indicative of the flow along the sections of pipe which link them.

As described further below, the geographic or network location of an anomaly detected by the Anomaly Engine 110 is calculated by the Geolocation Engine 100 as described further below. The system stores, manipulates, and reports to the user, regions in the form of predefined network parts (such as a DMA, or pressure zone), polygon on a geographical map, a range of addresses (in one embodiment from GIS data), or a set of marked or named network assets, such as lengths of pipe. Anomalies and events identified by the Anomaly Engine 110 include leaks, bursts, unexpected consumption of water, breached or wrongly opened valve, faulty meters, meter calibration problems, water quality changes, other issues important to the quantity of water being delivered over the network, malfunctions in network devices, and other issues known to those skilled in the art.

As shown in FIG. 1, when Geolocation Engine 100 has calculated location information, that information is transmitted to User Interface 130.

Although illustrated as a single system, in various embodiments the illustrated system may be integrated and/or distributed across multiple hardware devices and may be distributed logically, physically or geographically. Geolocation Engine 100 may be any suitable physical processing device performing processing operations as described herein, in response to executable instructions. Geolocation Engine 100 may also include any suitable type of storage device operative to electronically store data.

One of skill in the art will also appreciate that if there are multiple independent measurement opportunities, these are combined as repeat tests to improve accuracy, e.g. when there is a prolonged anomaly (providing measurements which are sufficiently far apart chronologically to be independent statistically) or a recurring anomaly such as a leak which is active only at night, or a consumer with exceptional use at specific hours.

Figure 2:
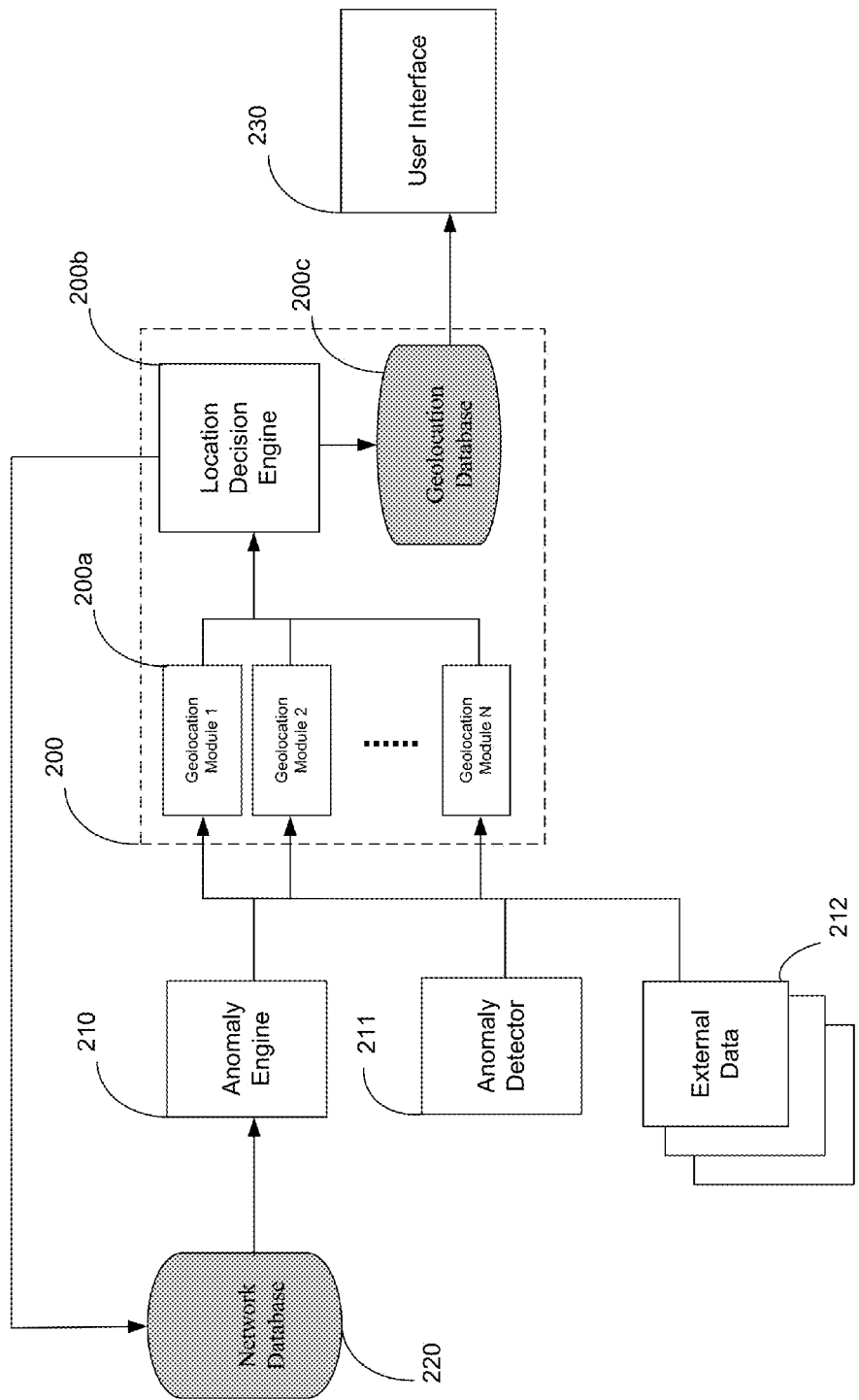

FIG. 2 presents a block diagram depicting further details of system for locating anomalies in a water utility network according to certain embodiments. In one embodiment, elements 200a-200c form the Geolocation Engine 100 of FIG. 1. FIG. 2 includes Geolocation Engine 200, Anomaly Engine 210 and/or Anomaly Detector 211, External Data 212, Network Database 220, and User Interface 230.

In one embodiment, Geolocation Modules 200a contain N number of individual modules using various separate and distinct techniques to statistically predict the location or statistically likely location of an anomaly occurring somewhere in the water utility network. As described further below, the Geolocation Modules 200a analyze sets of data received from the Anomaly Engine 210 and/or Anomaly Detector 211, and External Data 212. A typical anomaly report includes a type of the anomaly, an approximate location, a start or detection time, optionally an end time, optionally relevant meter data or indication of the relevant meters, and optionally further characteristics received from the anomaly detection engine, such as a magnitude of the event. Geolocation Modules 200a use, in parallel, multiple tests, each embodied in one or more programming modules, which determine where the anomaly is likely to be along the network. The results are then transmitted to the Location Decision Engine 200b and the results are combined statistically to determine a location of the anomaly. Geolocation Modules 200a can transmit instructions to meters, data loggers, or other utility data systems to temporarily change the rate or manner in which they collect data. In some embodiments, inputs into Geolocation Modules 200a may include data from sensors measuring flow, pressure, sound/noise, or other indicators of water motion in the network, as well as a digital map of the network (GIS) and its environment, or schematic, archived historical data from such sensors, and logs of repairs and external data. The sensor or sensors to be analyzed are those sensors most likely to be affected by an anomaly in the general region known to contain the anomaly. For example, for some tests, these may be the sensors on pipes leading into, within, or within the vicinity of the geographical area or district metered area ("DMA") containing the anomaly. One skilled in the art will appreciate that in selection of relevant sensors for some of the tests, a sensor is not typically useful if the sensor and general known location of the anomaly are separated by another similar (functioning) sensor or by an active network device which would impede the propagation of the anomaly measurable by the sensor (e.g. reservoirs "interrupt" flow and pressure signals).

Anomaly Detector 211 which also provides inputs to Geolocation Modules 200a may include information from alternative anomaly detection methods or processes not employing the Anomaly Engine 210, such as visible burst reports and consumer complaints regarding service failures.

External Data 212 can also supply additional information to Geolocation Modules 200a to facilitate prediction of the location or statistically likely location of an anomaly occurring somewhere in the water utility network. Data supplied by External Data 212 includes additional information relevant to water consumption and network conditions, but not strictly within the above categories, such as weather reports, holidays or other calendar events that affect water consumption and network behavior within the water utility network, or any other event by the utility itself or its customers that may impact the function of the network. In some embodiments, External Data 212 includes records of telephone calls from users to the water utility network operators informing the operators of visible leaks. From this information External Data 212 supplies information, such as dots on a map of leak locations, to the Geolocation Modules 200a.

In other embodiments, External Data 212 includes collections of external reports that indicate a region where a leak or anomaly is located, but not a precise location of the leak or anomaly. Service failures downstream of the anomaly or other visible burst reports can be supplied by External Data 212. External Data 212 can further include data supplied by field detection crews or other utility personnel who are involved in collecting additional data in an effort to locate the anomaly (e.g. an acoustic field survey targeted by some initial geolocation results). Any or all of the above noted External Data 212 can be supplied to Geolocation Modules 200a to facilitate more precise results.

The Location Decision Engine 200b then transmits the location information to Geolocation Database 200c, which then transmits the information to User Interface 230. User Interface 230 displays location information to a user. The location information displayed to the user via User Interface 230 includes, in some embodiments, a list of geographical areas and/or network pipes that are most likely to contain the anomaly, with a statistical score (such as a p-value or probability) assigned to each one or a simplified representation such as a "high probability" or "low probability" indication, or a color coded map, e.g. in order to help prioritize inspection by field crews. In some embodiments, the outputs include processed data, such as the relative magnitude of anomaly registered at each sensor location, and the above areas/pipes displayed on a map for a user to interactively improve the estimated location.

Location Decision Engine 200b can also remotely instruct Network Database 220, sensors or data collection systems (not pictured) connected to the water utility network to increase sampling rates of water or resources flowing through pipes or reservoirs once the anomaly is detected to improve the location capability for future changes in the anomaly. A notable exception regards those signals which are typically carried at flow rate (or even slower), such as some water quality indicators, where sampling rates of less than once a minute could still provide resolution in the hundreds of meters.

One skilled in the art will appreciate that using multiple modules, or tests, as represented by Geolocation Module 200a to compare statistical likelihoods from the N Geolocation Modules 200a may result in either an increased confidence that a location is the likely location of the anomaly, or may result in a decreased confidence that a location is the likely location of the anomaly. In one embodiment, the Location Decision Engine 200b may weigh the location data N Geolocation Module 200a equally. In another embodiment the Location Decision Engine 200b may assign weights to the locations sent from each N Geolocation Module 200a based on a predefined configuration. In another embodiment, the location decision engine uses a rule engine to determine precedence between conflicting results based on predefined rules.

Figure 3:
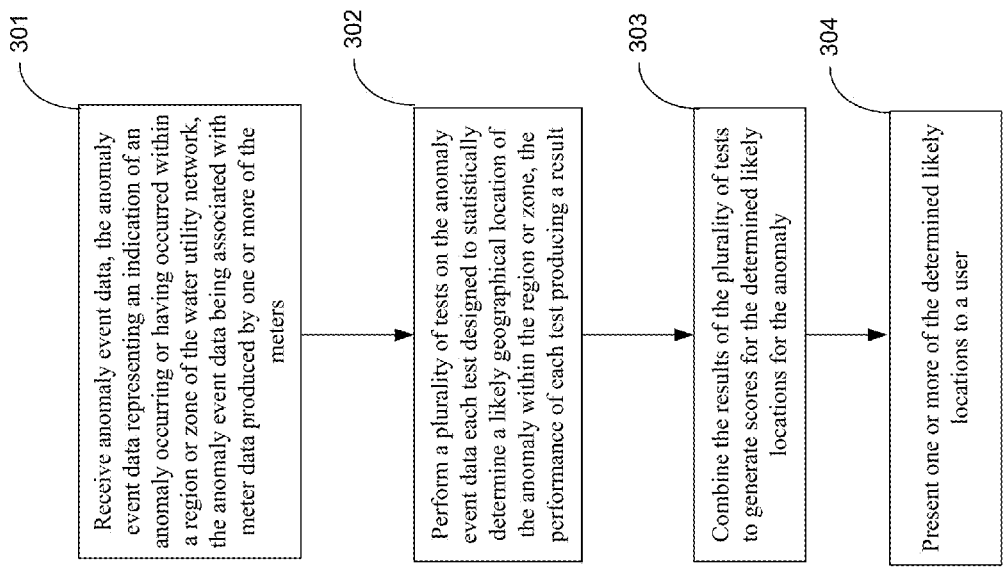

FIG. 3 presents a flow diagram illustrating an embodiment for a computerized method for determining one or more statistically likely geographical locations of an anomaly in a region or zone of a water utility network. In step 301, anomaly event data is received. The anomaly event data, in this embodiment, represents an indication of an anomaly occurring or having occurred within a region or zone of the water utility network, the anomaly event data being associated with meter data produced by one or more of the meters. In some embodiments the anomaly data is previously calculated as disclosed in the previously mentioned U.S. patent application Ser. No. 12/717,944. Next, in step 302 a plurality of tests are performed on the anomaly event data, each test designed to statistically determine a likely geographical location of the anomaly within the region or zone, with the performance of each test producing a result. Next, in step 303 the results of the plurality of tests to generate scores for the determined likely locations for the anomaly are combined. Steps 302 and 303, in some embodiments, are performed by element 100 in FIG. 1, or more specifically any combination of elements 200a-200c in FIG. 2. Finally, in step 304 one or more of the determined likely locations are presented to a user. Step 304, in some embodiments, is performed by element 130 in FIG. 1, or element 230 in FIG. 2.

Figure 4:
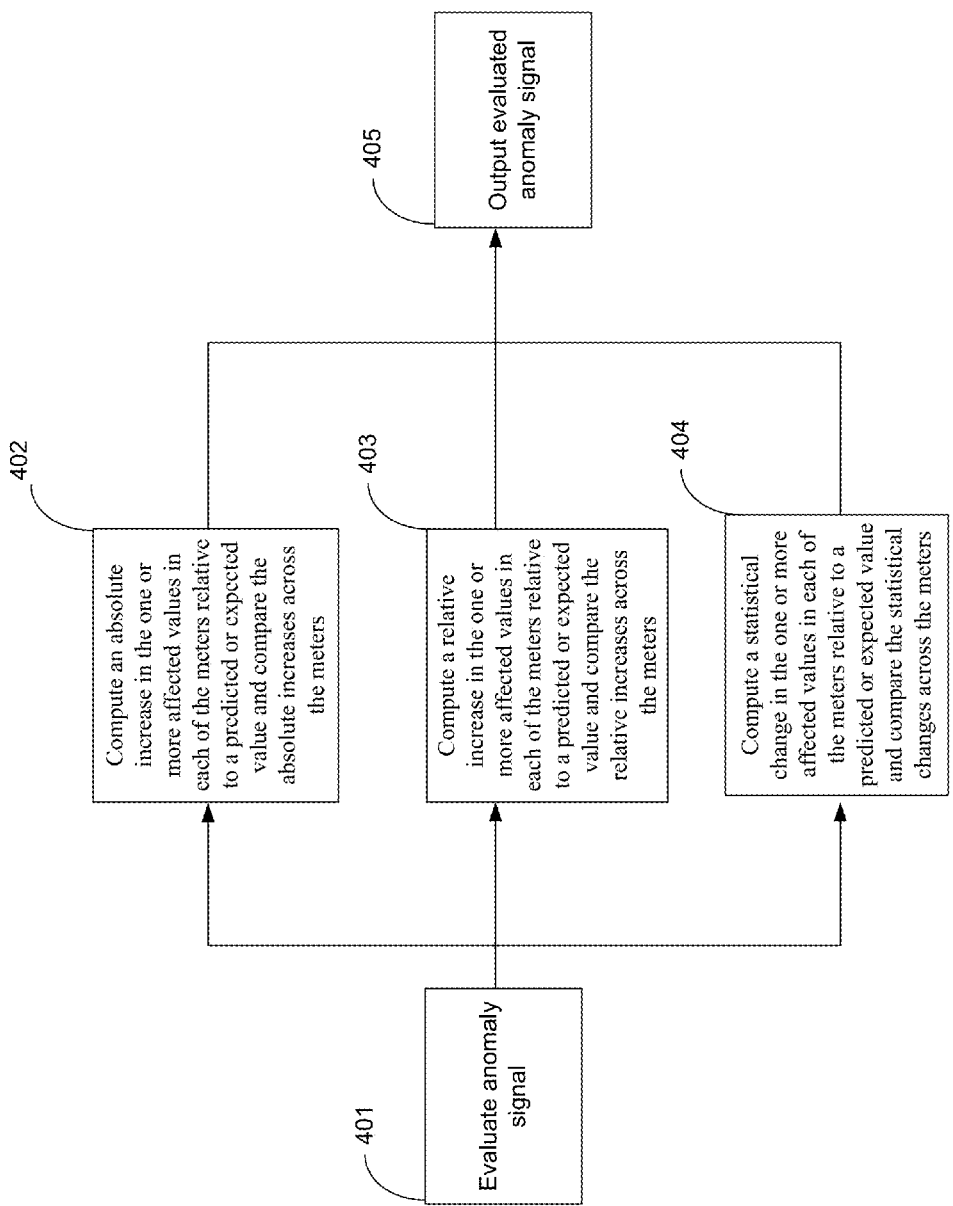

FIG. 4 presents a flow diagram illustrating one embodiment of one of the plurality of tests on the anomaly event data. In the embodiment presented by FIG. 4, relative magnitudes of the anomaly in multiple sensors, for signal types such as flow and noise are compared. In step 401 the anomaly signal at each sensor is evaluated according to at least one of the methods represented in elements 402 through 404. In element 402 an absolute increase in the one or more affected values in each of the meters relative to a predicted or expected value is computed, and then the absolute increases across the meters is compared. Alternatively, in step 403 a relative increase in the one or more affected values in each of the meters relative to a predicted or expected value is computed, and that computation is compared with the relative increases across the meters. Alternatively, in step 404, a statistical change in the one or more affected values in each of the meters relative to a predicted or expected value is computed, and the statistical changes across the meters are compared. Next, in step 405, the evaluated anomaly signal is output. Possible outputs for this step include, but are not limited to: (1) a "closest sensor(s)" output; (2) decision-support output for a user including scores for each sensor plus previous such outputs of similar historical anomalies, with their known geolocation; (3) full output for further processing via a Machine Learning method, which is provided in further detail below with respect to FIG. 7.

As often occurs in water utility networks, pressure sensors are spread more densely (in a fixed sensor array, or as mobile sensors brought in to help locate the anomaly). One statistical determination can be a pressure drop between two or more sensors related to flow in that network section. Thus, even if the exact flows between the sensors are not known, which can require a complex hydraulic model, this statistically significant pressure drop indicates a likely change in flow. FIG. 5 presents a flow diagram illustrating one embodiment for performing at least one of the plurality of tests for statistically determining a likely geographical location of the anomaly. In step 501 a change is computed in the one or more values of the difference between the values of a pair of meters hydraulically connected to one another from the one or more prior or expected values of that difference. One example of values could be a pressure value taken from multiple measurements of the water utility network. Next, in step 502, whether any of the one or more computed changes is statistically significant is determined. Then, in step 503, the section between a pair of hydraulically connected meters is identified as a likely location of the anomaly, if the change in one or more values as between such hydraulically connected meters is determined to be statistically significant.

FIG. 6 presents a flow diagram illustrating one embodiment for comparing the anomaly event data to the prior anomaly event data, from an historical record. In step 601 parameters in the anomaly event data are statistically compared to corresponding parameters of the prior anomaly event data. Examples of parameters in the anomaly event data include raw meter data, geographical data, and/or external conditions (such as date, weather, or concurrent network operations/conditions). For example, an anomaly is considered similar to prior anomalies if the individual meter values or individual meter anomaly magnitudes are similar. As a further example, such an analysis may determine that a particular pipe section is a likely location for a leak detected during a known, planned high pressure procedure by the network operators, if a particular flow meter is most strongly affected.

One example of statistical comparison includes a clustering method, such as K-Nearest Neighbor ("KNN"), which groups anomalies into clusters of events with similar characteristics and a significantly unique distribution of location information (such as a marked tendency to be in a particular quarter of a DMA).

Next, in step 602, the geographical location of the prior anomaly event data as a likely location of the anomaly is identified if the parameters of the anomaly event data are statistically significantly similar to the parameters of the prior anomaly data. By way of further detail for the present embodiment, to predict the most likely location of a new event being analyzed, the system finds the cluster (or clusters) closest to it, and returns that cluster's location distribution (or combination of those distributions). Other embodiments for comparing the anomaly event data to the prior anomaly event data further involve calculating relationships between each of the plurality of prior anomalies by clustering the plurality of prior anomaly event data based on associated locations for each of the plurality of previous anomalies, and identifying a likely location of the anomaly includes comparing anomaly event data with the clustered prior anomaly data and selecting a cluster closest to the associated anomaly data.

In some embodiments, even when event-specific data is not helpful in determining location, the system constructs an a priori distribution describing where leaks (or other anomaly types) are likeliest to occur. In further embodiments, the system determines where events of a particular type are historically likely to occur, based on previously logged and repaired events (e.g. if 40% of events in a certain DMA occurred along a particular pipe section, then a new event is considered 40% likely to be on that section). Modeling likely anomaly location using this training set of historical data provides a fixed probabilistic prediction of geolocation (regardless of further data, beyond the general location, e.g. at DMA level). Similarly, if data is available, the system constructs a distribution, using detailed geographical and/or network data such as soil type or pipe material and age. The mapping from e.g. soil type and pipe age to relative burst probability is either input (from prior research), or measured directly from data, or (if the space is large and data points scarce) predicted by a generic Machine Learning technique such as KNN clustering. This learning may rely also on data from other water networks, if they are sufficiently similar, and if relevant differences (such as distribution of pipe ages) are reasonably captured by the parameters being used.

Figures 7, 8, 9:
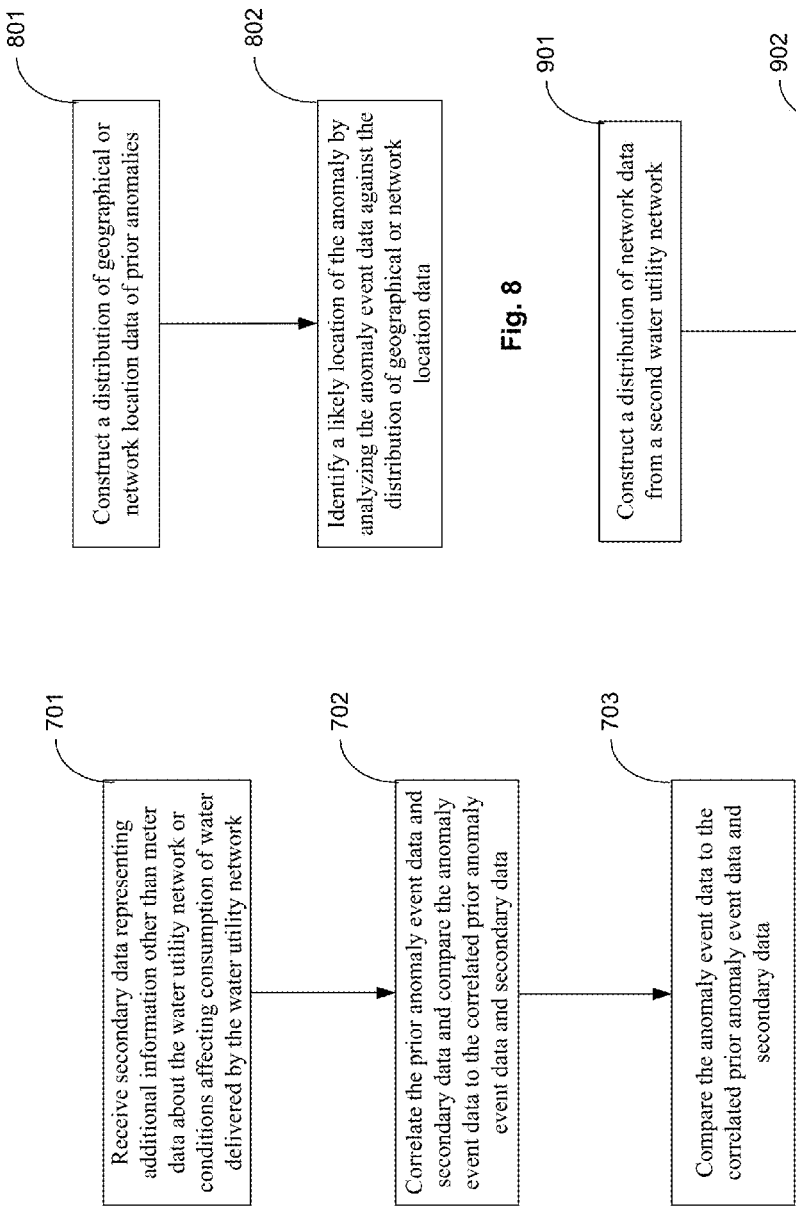

More generally, FIG. 7 presents a flow diagram illustrating one embodiment for performing at least one of a plurality of tests for statistically determine a likely geographical location of an anomaly within a region or zone, for example, as described in the paragraph above. In step 701 secondary data is received, the secondary data representing additional information other than meter data about the water utility network or conditions affecting consumption of water delivered by the water utility network. Next, in step 702, the prior anomaly event data is correlated with secondary data. The anomaly event data is then compared to the correlated prior anomaly event data and secondary data. Next, in step 703, the anomaly event data is compared to the correlated prior anomaly event data and the secondary data. FIGS. 8 and 9 provide further detail, in additional embodiments, for correlating the prior anomaly event data and secondary data.

Depending on the available data, certain methods for leak location may not be able to provide a very tight location, in terms of geographical radius. Moreover, the detection of the anomaly may have been provided by the alternative anomaly detection methods or processes, which naturally tend to provide location in geographical terms rather than network structure terms. For effective management of the anomaly there may also be considerable value in identification of a network route which contains the anomaly, e.g. to enable network operators to shut off an upstream valve, as multiple mains often run parallel and/or in close geographic proximity (e.g. under the same road) for long distances, and even quite an accurate burst location may be hard to correlate to the correct network asset. In such situations the output is based on network location rather than geographic notation. (When the geographic area uniquely determines the network area, such as in a typical distribution scenario, the output may be displayed as an approximate geographical region, for greater convenience. This is not always sufficient, as two different pressure zones may overlap significantly, e.g. if they supply the lower floor and the higher floors of buildings in a given neighborhood). One of the outputs of the system may be based on network location such as a list of named assets, or a geographical or schematic location of where the anomaly is likely to be located.

FIG. 8 presents a flow diagram illustrating one embodiment for correlating the prior anomaly event data and secondary data described in FIG. 7. First, in step 801, a distribution of geographical or network location data of prior anomalies is constructed. Then, in step 802, a likely location of the anomaly is identified by analyzing the anomaly event data against the distribution of geographical or network location data.

FIG. 9 presents a flow diagram illustrating another embodiment for correlating the prior anomaly event data and secondary data described in FIG. 7. First, in step 901, a distribution of network data from a second water utility network is constructed. Then, in step 902, a likely location of the anomaly is identified by analyzing the anomaly event data against the distribution of network data from the second water utility network.

FIG. 10 presents a flow diagram illustrating one embodiment for performing one of the plurality of tests to statistically determine a likely geographical location of the anomaly. In step 1001 a time of detection for the anomaly is received from at least two of the plurality of meters affected by the anomaly. This embodiment compares times of anomaly detection at each sensor, when the start of the anomaly or some other feature of it is sufficiently sharply-defined, and the sampling of the relevant quantity is rapid enough compared to that signal's speed of propagation. Next, in step 1002, data indicating a speed of propagation through each pipe in the water utility network for the detected anomaly is determined. Next, in step 1003 the likely location of the anomaly is calculated by combining the time of detection for the anomaly and the speed of propagation to determine a location or locations where the differences between measured times of arrival match the expected times of arrival between possible locations of the anomaly. The area or areas from which signals could be received with such time differences, taking into account the inaccuracy in time-stamps (e.g. +/−1 minute) are presented to the user. The determined intersection of pipes between possible locations of the anomaly is, in some embodiments, presented to a user via User Interface 130 or 230 of FIGS. 1 and 2, respectively.

This method represented by the embodiment of FIG. 10 is similar to calculating Delta Time of Arrival in RADAR. However, in water networks most relevant signals propagate only along network pathways. For some sensor types, this calculation may require very rapid (and accurately time-stamped) sampling of sensors, e.g., because flow and pressure changes are carried through pressurized pipes at the speed of sound, making a one-second difference equivalent to an offset of hundreds of meters. In some embodiments, therefore, the system remotely instructs the sensors or data collection systems connected to them to increase the sampling rates once the anomaly is detected to improve the location capability for future changes in the anomaly. A notable exception regards those signals which are typically carried at flow rate (or even slower), such as some water quality indicators, where sampling rates of less than once a minute could still provide resolution in the hundreds of meters.

In place of or addition to the Machine Learning techniques described with respect to FIG. 6, and also the method described with respect to FIG. 10, characteristics of the current anomaly and related information, along with the same data for previous similar events (at least belonging to the same DMA, perhaps more narrowly filtered) may be displayed to the user via a user interface. The user may then make an educated guess as to precise location, possibly taking into account further data or experience not present in the system.

FIG. 11 presents a flow diagram illustrating one embodiment for a test performed by an analysis engine to statistically determine a likely location of the anomaly. In step 1101, data indicating the occurrence of a plurality of previous anomalies is received. Next, in step 1102, relationships between each of the plurality of previous anomalies is calculated by clustering the plurality of previous anomalies based on anomaly data, especially meter data or the individual meters' magnitudes of anomaly and associated locations for each of the plurality of previous anomalies. Finally, in step 1103, the location of the anomaly is predicted by comparing associated anomaly data with cluster data, and the cluster closest to the associated anomaly data is selected. The selected cluster is, in some embodiments, presented to a user via User Interface 130 or 230 of FIGS. 1 and 2, respectively.

In one embodiment, certain assets or parts of the network are selected (or ruled out) as likely locations for the anomaly based on characteristics of the detected anomaly, and its mode of detection, and fixed physical constrains, e.g., determined by network structure. For example, a leak with a large associated flow cannot be along a small diameter pipe: if a pipe of diameter 10 cm is estimated to have a maximum flow of 60 $m^3/hr$, then any burst with a higher rate cannot be along that pipe. As another example, if there are related service failures in the area of a water loss anomaly which have been detected or have been called in by customers, (e.g., low pressure at several service connections), they must be downstream of the anomaly.

Figure 12:
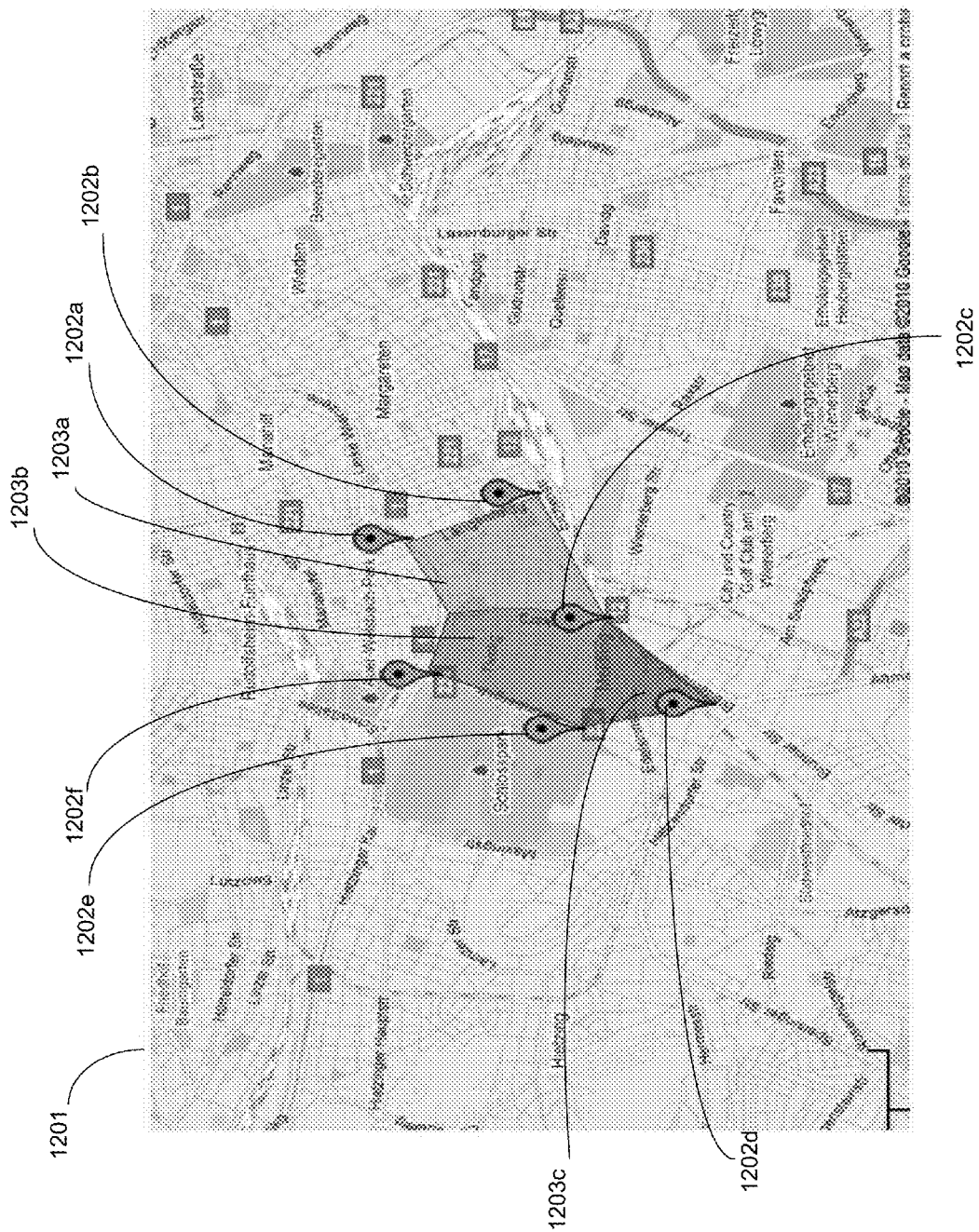
FIGS. 12 through 14 present screenshots showing a web user interface presenting event information generated by the geolocation engine according to embodiments of the present invention.

FIG. 12 illustrates a screenshot of the user interface ("UI") generated by the geolocation engine according to one embodiment of the present invention. FIG. 12 includes screen 1201 containing asset locations, such as meters or sensors, 1202a-f, and zones 1203a-c. Assets 1203a-c are overlaid on the map and depict likely anomaly locations as well as "closest sensors" output. The screen 1201 in FIG. 12 displays colored or shaded zones 1203a-c indicating several different levels of anomaly location confidence to a user. The user may, for example, be a worker at a water utility network tasked with monitoring the water network under analysis. In the embodiment shown, darker pink, such as 1203c compared to 1203b, is more likely to contain the anomaly, whereas zone 1203b is more likely than zone 1203a to contain the anomaly. Such ranking of likely locations is derived from a simplified representation of the results of the individual statistical tests; for example, the system may have determined that zone 1203c is likeliest to contain the anomaly because sensor 1202d was most strongly affected by it.

Figure 13:
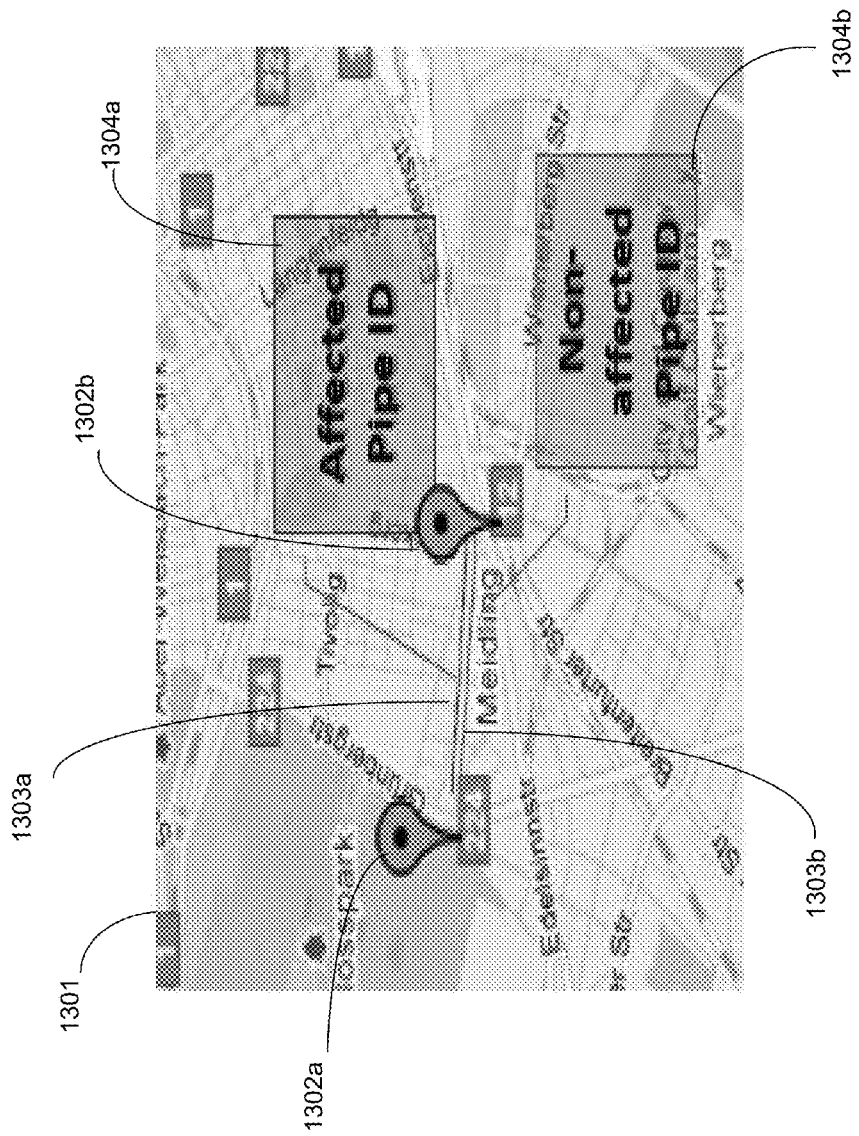

FIG. 13 illustrates a screenshot of another UI generated by the geolocation engine according to one embodiment of the present invention. FIG. 13 includes screen 1301 containing asset locations 1302a-b, pipes 1303a-b, and notifications 1304a-b. The screen 1301 displays colored indications of a pipe 1303a affected by a detected anomaly and located between assets 1302a-b. Notification 1304a is provided to indicate to a user of the UI that pipe 1303a is affected by the detected anomaly. Furthermore, in this embodiment, another pipe 1303b is disposed in geographic proximity, roughly between asset locations 1302a-b, however, pipe 1303b is not affected by the detected anomaly, and is shaded in green. Screen 1301 further includes notification 1304b indicating to a user of the UI such information, by means of a uniquely interpretable identifier used by the utility, such as a serial number or name identifying the pipe section 1303a in the utility's GIS system. One of skill in the art will appreciate the utility of being provided with notifications 1304a-b of affected 1303a and non-affected 1303b pipes located between the same set of assets located at or near elements 1302a-b.

Figure 14:
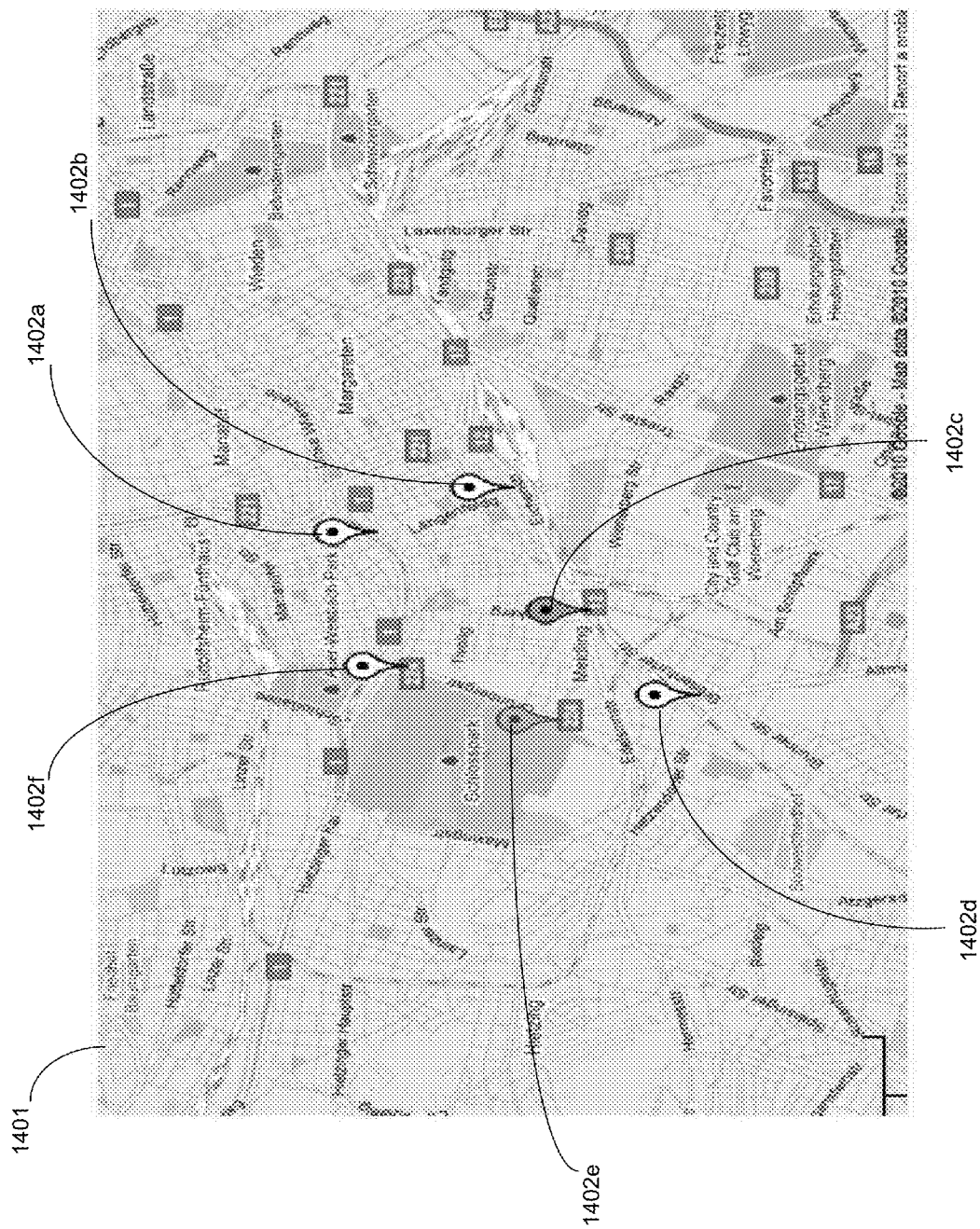

FIG. 14 illustrates a screenshot of another UI generated by the geolocation engine according to one embodiment of the present invention. FIG. 14 includes screen 1401 and asset locations 1402a-f. The screen 1401 displays colored indications of asset locations 1402a-f affected by a detected anomaly. The colored indications assigned to each asset location 1402a-c present anomaly location confidence to a user of the UI. Such indications may be used for "closest sensors" output (for example when pins represent sensor locations at a DMA perimeter, and the anomaly is assumed to be in a pipe within the DMA) or when the anomaly is such that location is discrete, i.e. at one of a few point assets (for example when pins represent DMA or pressure-zone boundary valves, one of which is assumed to contain the anomaly, or when pins represent a set of sensors and it has been determined that one of that set is faulty). In this embodiment, asset location 1402c, which includes the likely location of the detected anomaly, is shaded darker than asset locations 1402a-b or 1402d-f because geolocation engine has determined that a confidence level associated with asset location 1402c is greater than the other asset locations. Likewise, asset location 1402e is shaded because geolocation engine has determined, with some confidence, that the detected anomaly is located at asset location 1402e.

However, asset location 1402e is not shaded as dark as asset location 1402c, indicating that the geolocation engine is less confident that the detected anomaly is located at asset location 1402e than at asset location 1402c. Asset location 1402c is also shaded darker than all other asset locations to indicate that the magnitude of the detected anomaly is greater at this location.

FIGS. 1 through 14 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

It should also be understood that the invention applies not only to water utility networks, but to any type of distribution system. Other types of distribution systems may be: oil, wastewater or sewage, gas, electric, telephony, automobile traffic, or other energy delivery systems which involve fluid or flowing resources from one area to consumers. Indeed, the invention may be applied to any distribution or collection system having meters or sensors at arbitrary locations in the network measuring distribution parameters such as flow, pressure, quality or the flow of data itself.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for determining one or more statistically likely geographical locations of an anomaly in a region or zone of a water utility network, the water utility network comprising at least a network of pipes for delivering water to consumers and a plurality of meters positioned within the water utility network including a plurality of meters capturing data regarding the water delivering within the region or zone of the anomaly, the method comprising:
   receiving anomaly event data, the anomaly event data representing an indication of an anomaly occurring or having occurred within a region or zone of the water utility network, the anomaly event data being associated with meter data produced by one or more of the meters;
   performing a plurality of tests on the anomaly event data each designed to statistically determine a likely geographical location of the anomaly within the region or zone, the performance of each test producing a result;
   combining the results of the plurality of tests to generate scores for the determined likely locations for the anomaly; and
   presenting one or more of the determined likely locations to a user.

2. The computerized method of claim 1, comprising receiving the meter data associated with the received anomaly event data, and wherein performing a plurality of tests comprises performing at least one test on the anomaly event data and the associated meter data.

3. The computerized method of claim 2, wherein receiving the meter data comprises receiving meter data representing flow or pressure of the water in the water utility network.

4. The computerized method of claim 1, comprising receiving secondary data representing additional information other than meter data about the water utility network or conditions affecting consumption of water delivered by the water utility network or affecting network operation, and wherein performing the tests comprises performing at least one test on the anomaly event data and received secondary data.

5. The computerized method of claim 4, wherein receiving secondary data comprises receiving secondary data selected from the group consisting of:
   map data representing a geographical map of the water utility network;
   historical data representing past meter data for the meter data associated with the anomaly event data;
   repair data representing one or more repairs performed on the water utility network; and
   external data representing weather or other conditions affecting water consumption in the water utility network or affecting network operation.

6. The computerized method of claim 1, wherein performing a plurality of tests comprises performing two or more of the tests in parallel on the anomaly event data.

7. The computerized method of claim 1, wherein performing a plurality of tests comprises performing at least one of the tests on the anomaly event data and the result of another of the tests.

8. The computerized method of claim 1, wherein receiving anomaly event data comprises receiving a plurality of anomaly event data sets over time representing an indication the same anomaly continuing to occur in the water utility network at different times, and wherein performing a plurality of tests comprises repeatedly performing at least one of the tests, each performance being on each received anomaly event data set.

9. The computerized method of claim 1, wherein receiving anomaly event data comprises retrieving the anomaly event data from a database.

10. The computerized method of claim 1, wherein receiving anomaly event data comprises receiving the anomaly event data over a network.

11. The computerized method of claim 1, comprising receiving the meter data associated with the anomaly event data, the meter data including one or more values of parameters affected by the anomaly, and wherein performing a plurality of tests comprises performing at least one of the tests by comparing the one or more affected values of the meter data across a plurality of the meters and identifying one of the meters as being most affected by the anomaly.

12. The computerized method of claim 11, wherein comparing the one or more affected values of the meter data comprises at least one of:
   computing an absolute increase in the one or more affected values in each of the meters relative to a predicted or expected value and comparing the absolute increases across the meters;
   computing a relative increase in the one or more affected values in each of the meters relative to a predicted or expected value and comparing the relative increases across the meters; and
   computing a statistical change in the one or more affected values in each of the meters relative to a predicted or expected value and comparing the statistical changes across the meters.

13. The computerized method of claim 11, wherein the anomaly event data represents an indication of a leak, and wherein comparing one or more affected values comprises comparing flow or pressure values in the meters.

14. The computerized method of claim 1, comprising receiving the meter data associated with the anomaly event data including one or more values of parameters affected by the anomaly, and receiving prior meter data presenting data provided by the meters from one or more times prior to the occurrence of the anomaly including one or more prior values of the parameters affected by the anomaly, and wherein performing a plurality of tests comprises performing at least one of the tests by:
   computing a change in the one or more values of the difference between values of a pair of meters hydraulically connected to one another from one or more prior or expected values of that difference;
   determining whether any of the one or more computed changes is statistically significant; and
   identifying the section between a pair of hydraulically connected meters as a likely location of the anomaly if the change in one or more values as between such hydraulically connected meters is determined to be statistically significant.

15. The computerized method of claim 14, wherein receiving the meter data and prior meter data comprises receiving pressure values and prior pressure values, respectively, and wherein computing a change comprises computing a pressure drop between one or more pairs of hydraulically connected meters and a prior pressure drop between the one or more pairs of hydraulically connected meters.

16. The computerized method of claim 1, comprising receiving prior anomaly event data representing one or more prior occurrences of the same type of anomaly in the water utility network and a geographical location for each of the one or more prior occurrences, and wherein performing a plurality of tests comprises performing at least one of the tests by comparing the anomaly event data to the prior anomaly event data.

17. The computerized method of claim 16, wherein comparing the anomaly event data to the prior anomaly event data comprises:
   statistically comparing parameters in the anomaly event data to corresponding parameters of the prior anomaly event data; and
   identifying the geographical location of the prior anomaly event data as a likely location of the anomaly if the parameters of the anomaly event data are statistically significantly similar to the parameters of the prior anomaly data.

18. The computerized method of claim 17, comprising calculating relationships between each of the plurality of prior anomalies by clustering the plurality of prior anomaly event data based on associated locations for each of the plurality of previous anomalies, and wherein identifying a likely location of the anomaly comprises comparing anomaly event data with the clustered prior anomaly data and selecting a cluster closest to the associated anomaly data.

19. The computerized method of claim 1 comprising receiving secondary data representing additional information other than meter data about the water utility network or conditions affecting consumption of water delivered by the water utility network, and wherein performing a plurality of tests comprises performing at least one of the tests by correlating the prior anomaly event data and secondary data and comparing the anomaly event data to the correlated prior anomaly event data and secondary data.

20. The computerized method of claim 19 wherein correlating the prior anomaly event data and secondary data comprises constructing a distribution of geographical or network location data of prior anomalies, and wherein identifying a likely location of the anomaly comprises analyzing the anomaly event data against the distribution of geographical or network location data.

21. The computerized method of claim 19 wherein correlating the prior anomaly event data and secondary data comprises constructing a distribution of network data from a second water utility network; and wherein identifying a likely location of the anomaly comprises analyzing the anomaly event data against the distribution of network data from the second water utility network.

22. The computerized method of claim 1 wherein performing a plurality of tests comprises performing at least of the tests by:
   receiving, from at least one of the plurality of meters affected by the anomaly, a time of detection for the anomaly;
   receiving data indicating a speed of propagation along the network for the detected anomaly; and
   calculating the likely location of the anomaly by combining the time of detection for the anomaly and the speed of propagation to determine a location where differences between measured times of arrival match expected times of arrival.

23. The computerized method of claim 1 wherein presenting the likely location of the anomaly further comprises eliminating a likely location of the anomaly by comparing characteristics of the anomaly and fixed constraints.

24. The computerized method of claim 23, wherein fixed constraints are selected from the set consisting of: pipe diameter data, service failure data, and network layout data.

25. The computerized method of claim 1 wherein presenting the likely location of the anomaly with a score assigned to the location of the anomaly comprises further presenting a network route likely to contain the likely location of the anomaly.

26. The computerized method of claim 1 comprising reporting characteristics of the anomaly and data associated with related anomalies detected previously.

27. A computerized system for determining one or more likely locations of an anomaly, the one or more likely locations of the anomaly disposed throughout a water utility network, the water utility network comprising at least a network of pipes for delivering water to consumers and a plurality of meters positioned within the water utility network, the system comprising:
   a network information database for receiving anomaly data, the anomaly data representing an indication of an anomaly having occurred within the water utility network, the indication of the anomaly being associated with meter data produced by one or more of the meters;
   an analysis engine for performing a plurality of separate tests to statistically determine a likely location of the anomaly by statistically combining results of the plurality of tests to generate scores for each of the likely locations for the anomaly; and
   a user interface module for presenting the likely locations and associated scores to a user.

28. The computerized system of claim 27 wherein the analysis engine performs steps to calculate the likely location of the anomaly comprising comparing magnitudes of the data produced by the plurality of meters affected by the anomaly; and reporting an indication of the likely location of the anomaly to a user via a user interface.

29. The computerized system of claim 27, wherein the user interface module further retrieves the likely location of the anomaly and the score assigned to the location of the anomaly from the anomaly database and reporting the location of the anomaly and the score assigned to the location of the anomaly to a user.

30. The computerized system of claim 27 wherein a test performed by the analysis engine comprises:
   receiving data indicating the occurrence of a plurality of previous anomalies;
   calculating relationships between each of the plurality of previous anomalies by clustering the plurality of previous anomalies based on common events and associated locations for each of the plurality of previous anomalies; and
   predicting the location of the anomaly by comparing associated anomaly data with cluster data and selecting the cluster closest to the associated anomaly data.

* * * * *